United States Patent [19]

Burge et al.

[11] 3,815,356
[45] June 11, 1974

[54] FOAM COOLING AND ACOUSTIC DAMPING OF EXHAUST GASES PRODUCED BY AN INTERNAL COMBUSTION ENGINE

[75] Inventors: Harland L. Burge, Tarzana; Bruce J. Heckert, Woodland Hills; Newell C. Rodewald, Manhattan Beach, all of Calif.

[73] Assignee: TRW Inc., Redondo Beach, Calif.

[22] Filed: Mar. 10, 1971

[21] Appl. No.: 122,857

[52] U.S. Cl............... 60/204, 60/264, 60/271, 181/33 HC, 239/265.17
[51] Int. Cl............................................ B63h 11/00
[58] Field of Search ............. 60/265, 264, 204, 271; 239/265.17, 127.3; 181/33 B, 33 HC

[56] References Cited
UNITED STATES PATENTS

| | | | |
|---|---|---|---|
| 2,934,889 | 5/1960 | Powlos | 181/33 HC |
| 2,990,905 | 7/1961 | Lilley | 181/33 HC |
| 3,442,350 | 5/1969 | O'Brien | 181/33 B |
| 3,527,317 | 9/1970 | Motsinger | 181/33 HC |
| 3,596,734 | 8/1971 | Yates | 181/33 HC |
| 3,599,749 | 8/1971 | Millman | 181/33 HC |

*Primary Examiner*—Douglas Hart
*Attorney, Agent, or Firm*—Daniel T. Anderson; William B. Leach

[57] ABSTRACT

There is disclosed a method and apparatus for providing thermal protection and acoustic damping in an internal combustion engine by means of injecting a liquid base foam into the gas boundary zone of the combustion gases. A foaming agent, a liquid, and a gas are processed to produce a high expansion foam solution. In one embodiment the foam is generated external to the combustion chamber and is supplied to a distribution manifold located at the exit end of a rocket motor. The foam is then distributed through a plurality of orifices which direct the foam along the boundary of the combustion gases and thus into the jet boundary of the exhaust gases. The foam may be injected at any point along the gas boundary zone including the boundary layer upstream of the exhaust exit.

5 Claims, 6 Drawing Figures

Harland L. Burge
Bruce J. Heckert
Newell C. Rodewald
INVENTORS

BY William B. Leach

ATTORNEY

FOAM COOLING AND ACOUSTIC DAMPING OF EXHAUST GASES PRODUCED BY AN INTERNAL COMBUSTION ENGINE

BACKGROUND OF THE INVENTION

This invention relates both to the cooling of internal combustion engines and to the acoustic damping of noise generated by the exhaust gases.

The use of a liquid film to protect the walls of a rocket engine began with the effort on the German V-2 rocket engine. Since that time there has been a need for improved cooling techniques brought about by the use of high energy high temperature propellants, high chamber pressures and the need to lengthen engine life. Cooling efficiencies greater than 30 percent have seldon been achieved in controlled laboratory heat transfer experiments because the liquid film is subjected to severe shear stress which results in wave stripping at conditions typically found in a rocket motor. Wave stripping is the buildup of crests in the film resulting in a breakdown of the cooling properties. Liquid film cooling for rocket motors is generally recognized as an inefficient method of protecting the combustion chamber wall. Severe operating conditions are found in the combustion zone of a rocket motor and therefore thermal protection becomes of utmost importance. However, the method and apparatus disclosed herein may readily be applied to other forms of internal combustion engines.

The jet engine is a prime example of an internal combustion engine which requires some form of cooling either in the combustion zone or exhaust duct or both. The technique of cooling a rocket motor discussed herein are applicable to jet engines and the exhaust of reciprocating piston engines.

In addition to the thermal problem associated with the combustion there is also the problem of noise generated by the combustion process and sometimes added to by moving machinery associated therewith. One focal point for noise abatement recently has been that of the aviation industry. Increasing aviation requirements for higher powered engines have resulted in an increased aerodynamic related noise problem. Excellent progress has been made in the theoretical understanding of the source of such noise. Attempts to alleviate the noise problem have included the use of multiple nozzles, spike nozzles, slit nozzles and internal acoustically treated ducts. An example of another approach to the problem is that of the bypass fan engine wherein secondary air is injected to affect mixing shear layers. Other means of alleviating jet noise have been suggested including the injection of water and solid particles into the jet exhausts. The results have not indicated sufficient noise reduction for the amount of material injected.

An example of the injection of fluids into the combustion gases of jet engines may be found in the U.S. Patent to Wisniowski, U.S. Pat. No. 2,927,423, issued 1960. A more recent attempt of solving the noise problem is shown in the U.S. Patent to O'Brien, U.S. Pat. No. 3,442,350, issued 1969 wherein a manifold assembly extends radially around and spaced from the exhaust exit of an aircraft engine. Air is mixed with soapy water to produce an annular sheet of bubbles which surrounds the exhaust gases. The bubble sheet is initially separated from the exhaust gases by the ingestion of ambient air between the manifold and exhaust duct.

While O'Brien discloses a substantial contribution to the art of noise suppression, the applicants believe that substantial improvements in noise abatement may be accomplished by the principles of the invention disclosed herein.

It is accordingly an object of the present invention to provide a method and mechanism for providing thermal protection and acoustic damping of noise characteristics associated with combustion products in internal combustion engines which is not subject to the problems and shortcomings of the prior art.

It is another object of the present invention to provide a method and mechanism for providing film cooling of thermal characteristics and acoustic damping of noise characteristics associated with combustion products wherein a liquid base foam is injected into the gas boundary zone of the combustion products.

It is also an object of the present invention to provide a method and apparatus for acoustic damping of noise associated with exhaust products emitted from an internal combustion engine.

SUMMARY OF THE INVENTION

The invention includes both method and apparatus for providing film cooling of the walls in the exhaust ducts of an internal combustion engine as well as providing acoustic damping of the noise associated with the combustion process. The applicants have discovered that various liquid base foams have excellent thermal insulating and acoustic damping properties when such foams are injected into the gas boundary zone of the combustion gases, either in the boundary layer at or near the combustion wall or in the free jet boundary layer. The apparatus includes a foam generator of either the chemical or mechanical type for generating a foam solution from one of several suitable compositions. The invention further invisions means for injecting the foam solution directly into the gas boundary zone of the combustion gases and may include a manifold and a plurality of passageways terminating substantially in the gas boundary zone. The manifold and passageways or orifices may be located at any one of several axial positions along the flow of the combustion gases, either within the combustion zone of the engine, within the exhaust duct, or immediately downstream of the exhaust exit.

DESCRIPTION OF THE DRAWINGS

FIG. 1b is another embodiment of the foam solution generation and injection of FIGS. 1 and 1a;

DESCRIPTION OF THE PREFERRED EMBODIMENTS

Figure 1:
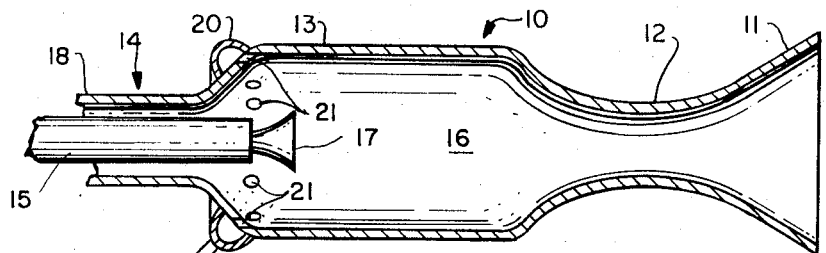
FIG. 1 is a diagram in partial cross-section showing a rocket motor into which there is injected, near the injector face, a film of foam supplied thereto from a foam generator in accordance with the principles of the present invention.

Turning now to the drawings, and with particular reference to FIG. 1, there is generally shown a rocket motor 10 having a nozzle section 11, a throat section 12, a combustion section 13 and an injector assembly 14. The injector assembly 14 includes a central distribution tube 15 to which fuel may be supplied and carried into the combustion zone 16 where it is distributed radially outwardly by a deflector element 17. The distribution tube 15 and the outer wall 18 of the injector assembly 14 form an annular passageway to which an oxidizer may be supplied and carried into the combustion zone 16 where it mixes with the fuel for combustion. An injector assembly of this type is generally referred to as a coaxial injector assembly. The rocket motor as described is an example of one internal combustion engine with which the invention herein may be practiced.

FIG. 1 further shows injection means which includes a distribution manifold 20 which is in communication with the combustion zone 16 by way of a plurality of orifices 21. Also shown in FIG. 1 is a foam generator which includes a gas supply 22. The gas may be supplied to a liquid supply tank 23 and a foaming agent supply tank 24 each of which is connected to a mixing chamber 25 wherein the gas, liquid, and foaming agent are combined to form a foam solution to be supplied to the distribution manifold 20 and then forced under pressure through the orifices 21. The foam will be carried along the walls by the combustion gases and is thereby effectively introduced into the gas boundary zone of the combustion gases. As used herein the term "gas boundary zone" is used to refer both to the boundary layer of the gas as it exists between the gas and a fixed boundary such as the walls of the rocket motor and also to the free jet boundary of the exhaust gases. The injection flow rate of the foam solution is adjusted so as to provide a continuous film of the foam solution on the walls of the rocket motor. As this discussion will develop, the advantage of the foam solution over the pure liquid as a film coolant is that the foam solution has a substantially increased viscosity which resists shearing action by the combustion gases and it has a highly increased surface tension over that of pure liquid which resists gas wave interaction stripping.

Experiments conducted with a 100 lb. - thrust rocket motor effectively showed that when foam was placed upon the combustion chamber wall at the injector end, as shown in FIG. 1, the foam was found to carry through the subsonic, transonic, and supersonic parts of the nozzle. It was also observed that the amount of fuel devoted to film cooling was substantially reduced. In rocket motors which introduce raw fuel along the combustion walls to serve as a film coolant, some 30 to 40 percent by weight of fuel is normally required to effectively film cool the engine. The aforementioned experiments indicated that 3 to 5 percent by weight of fuel was adequate as the liquid utilized in the foam generator. One of the phenomena associated with rocket motors is that of combustion roughness caused by combustion pressure perturbations or pressure waves. The combustion roughness is readily evident by changes in the noise level associated with the operation of the rocket motor. In the foregoing experiments, the rocket motor was operated both with and without foam coolant. With the foam on the walls of the rocket motor there was approximately a 40 percent reduction in the peak to peak roughness variations, thus indicating that the foam served well as an acoustic liner.

Figure 1A:
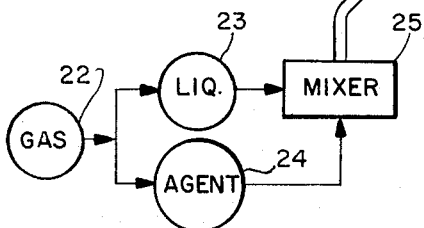
FIG. 1a is a diagram in partial cross-section showing an alternative embodiment of means for generating and injecting a foam solution in a rocket motor.
Figure 1A:
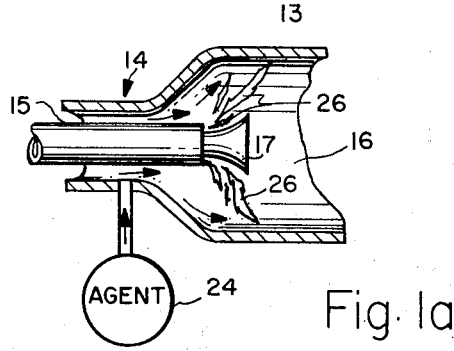

FIG. 1a is an alternative embodiment of the foregoing concept and sets forth another of a variety of ways in which the foam solution may be generated. In FIG. 1a the foam is generated through the use of the coaxial injector with the foaming agent being introduced directly into the main fuel supply. In this embodiment of the invention, the fuel plus foaming agent flows into the combustion zone where it interacts with the oxidizer flowing through the distribution tube 15 of the injector assembly and resulting in a flame front 26. The propellant flow rates are adjusted such that a part of the foaming agent and fuel combination will pass over the primary reaction zone or flame 26 and to the wall of the combustion zone where the fuel and foaming agent combination interact with relatively cool gases. These cool gases are entrapped in the liquid to generate a foam solution which then flows down and along the combustion zone wall.

Figure 1B:
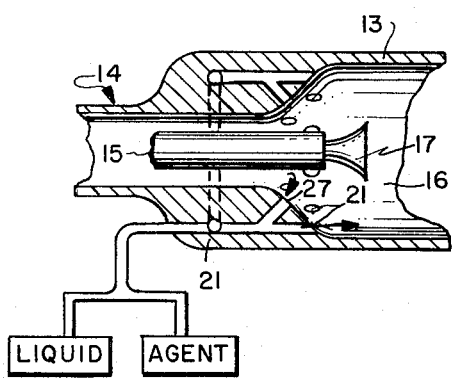

FIG. 1b shows yet another variation of the basic concept. In this variation a foaming agent and a liquid, which may be a rocket fuel, is introduced through a plurality of orifices 21. Associated with each of the plurality of orifices 21 is an aspirating tube or passage 27 through which relatively cool gases are aspirated into the orifices 21 where the gases are entrapped in the flowing liquid and the foaming agent serves to stabilize the foam solution. As in the embodiment of FIG. 1, the foam solution is injected along the walls of the combustion chamber 16. All of these embodiments utilize the basic concept of generating a foam solution which is then injected into the gas boundary zone of the combustion gases to provide an effective means of cooling the walls of the rocket engine and for providing an acoustic absorber to eliminate acoustical instabilities associated with combustion. The foregoing concepts are not limited to applications associated with rocket motors and, in fact, are applicable to all forms of internal combustion engines any of which may be substituted for the rocket engine shown in the figures.

Figure 2:
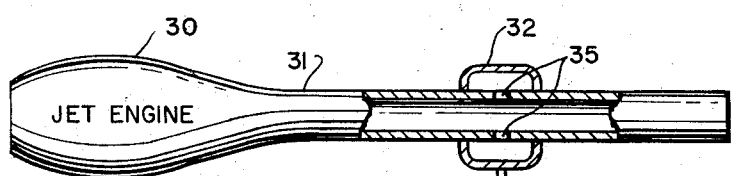
FIG. 2 is a diagram in partial cross-section showing an alternative embodiment in accordance with the present invention wherein foam is injected into the exhaust ducts of an engine.

Turning now to FIG. 2 there is shown an alternative embodiment constructed in accordance with the principles of the present invention and shown in conjunction with a jet engine. The jet engine 30 is of common design well known in the art and has associated therewith an exhaust duct 31 for directing the exhaust gases associated with the operation of the jet engine. Associated with the exhaust duct 31 is a distribution manifold 32 which is connected by a supply conduit 33 to a foam generator 34. The foam generator may include the various components described in FIG. 1.

A foam solution generated by the foam generator is supplied through conduit 33 to the manifold 32 and through a plurality of orifices 35. A foam solution so supplied will be effectively introduced or injected into the gas boundary zone of the exhaust gases as they traverse the exhaust duct 31. A foam solution injected in the manner as shown in FIG. 2 provides an effective means for cooling the exhaust duct as well as providing acoustic damping of the noise associated with the operation of the jet engine. It may be readily observed that the jet engine 30 may have substituted therefore a reciprocating piston engine or any other form of internal combustion engine.

Figure 3:
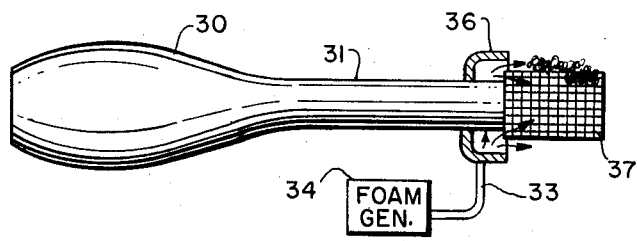
FIG. 3 is a diagram in partial cross-section showing a second alternative embodiment of the present invention used in association with a gas turbine engine.
Figure 4:
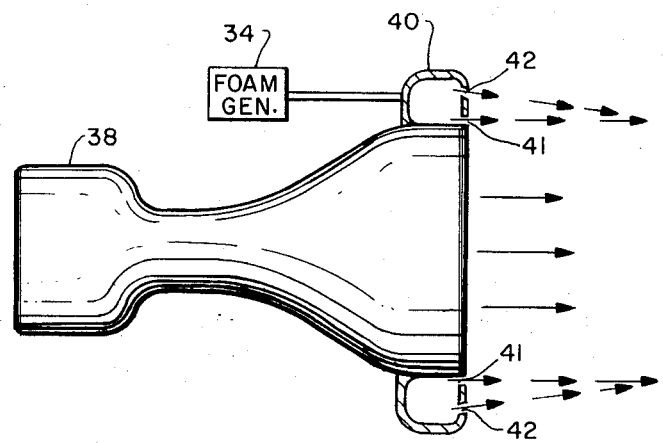
FIG. 4 is a diagram in partial cross-section of a third alternative embodiment of the present invention particularly suitable for providing acoustic damping of exhaust gases.

FIGS. 3 and 4 show configurations which are particularly suitable for providing acoustic damping of the noise associated with the operation of an internal combustion engine. In FIG. 3 there is shown a jet engine 30 having an exhaust duct 31 and further includes a foam generator 34 which may be used to supply a foam solution through conduit 33 into a distribution manifold 36. The distribution manifold 36 in this particular embodiment has an annular opening facing downstream and along the path of the combustion gases from the jet engine such that when a foam solution is forced through the annular opening the foam solution will be swept into the gas boundary zone of the exhaust gases. In such a configuration, the foam solution is being directed into the jet boundary of the free exhaust gases. When foam is so injected at a relatively low injection velocity the foam tends to be ingested into the exhaust gases which effectively destroy the acoustic damping capabilities. One way to overcome this difficulty is to provide a screen element 37 in the form of a hollow cylinder which is attached to the end of the exhaust duct 31 to form an extension thereof. A screen having a .10 inch square mesh is suitable for this purpose. The foam is then forced through the distribution manifold 36 and out the annular opening thereof, along the exterior of the screen element, and through the screen into the boundary zone. The use of such a screen element is an effective way of injecting a relatively large quantity of foam directly into the jet boundary of the exhaust gases. Experiments conducted by the applicants indicate that to effectively reduce the noise from gas jets the absorbing medium, or foam, must be continuously placed in the shear layer periphery of the jet (jet boundary zone) and cover the first two to four diameters effectively before breaking up and being ingested into the exhaust gases. The most noticable effect of the foam appears to be a reduced noise level in the frequency band of 400 to 2,000 cycles per second. Overall noise level reductions typically range from 3 to 6 db.

FIG. 4 shows an effective scheme for injecting the foam at high velocity so that it will cover the first two to four diameters of exhaust gases. As shown in FIG. 4 the foam generator 34 and injection means is used in association with a rocket motor 38. The injection means which includes a distribution manifold 40 which encompasses the exit end of the rocket nozzle includes a foam injection passageway 41 which may be in the form of a plurality of orifices or an annular opening. The injection passageway 41 is augmented by a second injection passageway disposed radially outwardly from the first passageway and may also be in the form of a plurality of orifices or an annular opening. In operation the first passageway 41 serves as a means for injecting foam directly into the jet boundary of the exhaust gases as they exit from the rocket motor. The second injection passageway 42 is aligned to intercept the jet boundary at a preselected distance downstream from the exhaust exit and thereby inject foam directly in the gas boundary zone. The use of the second or outer injection passageway is an effective means for providing a continuous blanket of foam for several diameters downstream of the exit.

FOAM TECHNOLOGY

The science of generating foams dates back many years. The primary application of foams in recent years has been in fire fighting and the majority of literature sources relate to this application. The science of foam generation involves the understanding of the interplay between surface chemistry and the mechanical forces present within the foam tending to hold it together or tending to break it down. The type of foaming agent, the concentration of agent, the expansion ratio of the foam, the ultimate shear stress, and the gas constituent are all variables in the production of foam and for practical purposes must be imperically determined for specific applications.

Studies of the deformation and the flow typical of foam solutions shows that the bulk viscosity of the foam is greatly increased over that of liquids. The effective thermal conductance of the foam is reduced from that of the parent liquid by virtue of entrapped low conductivity gases thus forming an insulating blanket. The effective surface tension of the foam is increased over that of the liquid by virtue of the entrapped bubble geometries and mechanical interlocking. The density of the foam is much lower than that of the constituent liquid. These various properties of foam lead to a greatly enhanced stability of the foam and resistance to free stream gas stripping. Because of these favorable qualities the quantity of material required for internal heat transfer protection can be reduced considerably below that required for pure liquid film cooling in almost direct ratio to the densities. A nominal 30 to 40 percent by weight of fuel is normally required in small rocket engines to effectively liquid film cool. With foam only a 3 to 5 percent by weight of fuel is necessary to provide cooling.

With regard to acoustic damping it is believed that energy dissipation is primarly twofold. First, on the surface of the foam the breakup of the foam enclosed gaseous bubbles involves a certain amount of volumetric change work and surface tension extension work. Secondly, and because the material is compressable and is viscously intertwined, additional energy is dissipated through viscous dissipation. It is known that a gas bubble in the foam tends to take on the shape of a sphere and work must be done to increase its surface which resist extension and has surface energy. Experimental results have also shown that a resonating bubble is characterized by violent activity in a liquid through which an intense sound wave is passing. Thus, it can be deducted that a resonating bubble plays a dominating role in determining acoustic damping characteristics. As a general guide to the selection of foams, it may be noted that the expansion ratio of the foam should be selected such that the average bubble size will resonate at the predominate frequency of interest. Also, the effective viscosities should be maximized and the foam should be placed in proximity of the generating noise source. The predominate type of foaming agent that has evolved is a protein hydrolysate made from such materials as hoof and horn meal, soybeans, and animal blood. Other types of foaming agents have been developed and marketed such as a polymeric film produced by agitating with air a solution of water and a linear low molecular weight polymer which is further reacted by a catalyst in the presence of air. This foam was specifically developed to combat fires. Another important foaming agent is a synthetic detergent type, which when added to water, is capable of foaming a high expansion foam of approximately 1,000 parts of air by volume to one part of liquid.

The concentration of the foaming agent affects the stability and heat resistance of foam. The basic effect of the foaming agent is to reduce the surface tension of the liquid. The ratio of the volume of foam to the volume of liquid is another fundamental parameter and is referred to as the expansion factor. Physical properties such as thermal conductivity and foam viscosity vary widely with the expansion factor. The size of the gas bubble for a given expansion ratio governs the ultimate shear stress which is a measure of the foam resistance to flow under static conditions. The heat resistance of a foam tends to increase markedly with an increase in the ultimate shear stress. In tests conducted by the Applicants, it was determined that for purposes of heat resistance, an expansion ratio of approximately 16 to one seemed to be optimum.

CONCLUSIONS

Both heat transfer and noise abatement studies have shown positive results with the use of foam injection. Internal acoustic absorption as well as external absorption appear practical ways of providing acoustic damping. In the jet engine, the application possibilities are numerous. With respect to compressor whine, internal surface application of foam seems practical. The foam generator may be automatically controlled so as to provide silencing of the jet engine only during takeoff, landing and low altitude operation near residential areas thereby reducing the quantity of liquid that would be needed to be carried on board the aircraft for foam generation purposes. As described herein the applicants have provided both a simple method and apparatus for providing thermal protection and acoustic damping of noise characteristics associated with the combustion product in internal combustion engines.

What is claimed:

1. In combination with a vehicle propelled by an internal combustion engine wherein the engine has an exit for exhaust gases, apparatus comprising:
   a. a foam generator carried by the vehicle for producing a foam solution; and
   b. injection means carried by the vehicle and associated with the exhaust exit for injecting the foam directly into the free jet gas boundary of the combustion gases, said injection means directing the foam solution in a contiguous layer for a distance downstream of the exhaust exit to a point proximate the region of peak sound level.

2. The apparatus of claim 1 wherein said injection means comprises:
   a. a hollow cylindrical screen element connected to the exit of the exhaust section and substantially forming an extension thereof;
   b. a manifold circumferentially mounted on the exterior of said screen and at the upstream end thereof and said manifold having at least one passageway from the interior thereof and in communication with the exterior surface of said screen element; and
   c. means interconnecting said foam generator and said manifold for injecting foam from said generator into said manifold whereby foam from the generator may be distributed upon the exterior surfaces of said screen element for injection through said screen into the free jet gas boundary.

3. The apparatus of claim 1 wherein said injection means comprises:
   a. a plurality of jets each having the exit nozzle proximate the exhaust gases as these gases exit from the internal combustion engine and said jets being oriented to direct foam directly into the jet boundary; and
   b. means connecting said jets to said foam generator for directing foam through said jets into and along the jet boundary.

4. The apparatus of claim 3 further comprising a second set of jets orientated to direct foam injected therethrough to intercept the exhaust gases downstream from the point at which the foam is injected by the first said jets.

5. A method of providing sound absorbing properties for combustion gases associated with and exiting from an internal combustion engine:
   a. providing a vehicle propelled by an internal combustion engine wherein the engine has an exit for exhausting combustion gases;
   b. mounting a foam generator for transport by the vehicle;
   c. mounting foam injection means for transport by the vehicle;
   d. generating a liquid base foam solution; and
   e. injecting the foam solution directly into the free jet boundary of the exhaust gases immediately downstream of the exhaust exit; and
   f. maintaining a contiguous layer of foam within the free jet boundary layer for a distance downstream of the exhaust exit extending to a point proximate the region of peak sound level.

* * * * *